US012371906B2

(12) United States Patent
Nill

(10) Patent No.: US 12,371,906 B2
(45) Date of Patent: Jul. 29, 2025

(54) ANCHOR PLATFORM ASSEMBLY

(71) Applicant: Lance Nill, Southampton, NY (US)

(72) Inventor: Lance Nill, Southampton, NY (US)

(73) Assignee: LN1 INC., Southampton, NY (US)

( * ) Notice: Subject to any disclaimer, the term of this patent is extended or adjusted under 35 U.S.C. 154(b) by 0 days.

(21) Appl. No.: 17/892,670

(22) Filed: Aug. 22, 2022

(65) Prior Publication Data
US 2023/0295930 A1 Sep. 21, 2023

Related U.S. Application Data

(63) Continuation of application No. 16/677,236, filed on Nov. 7, 2019, now Pat. No. 11,473,306, which is a
(Continued)

(51) Int. Cl.
E04D 13/00 (2006.01)
F16B 9/02 (2006.01)
E04F 11/18 (2006.01)

(52) U.S. Cl.
CPC ............... *E04D 13/00* (2013.01); *F16B 9/02* (2013.01); *E04F 11/1812* (2013.01); *E04F 11/1853* (2013.01)

(58) Field of Classification Search
CPC . E04D 13/00; E04D 1/34; E04D 13/14; F16B 9/026; F16B 37/122; F16B 37/125;
(Continued)

(56) References Cited

U.S. PATENT DOCUMENTS 827,613 A * 7/1906 Brown ................. E04B 1/4107
52/707
2,227,713 A * 1/1941 Higgins ................ E04B 5/12
52/704
(Continued)

FOREIGN PATENT DOCUMENTS

CN 2020004800 10/2011
CN 206309814 U 7/2017
(Continued)

OTHER PUBLICATIONS

State Intellectual Property Office of the People's Republic of China, Search Report issued for China Patent Application No. Application No. 201880081192.X (Applicant: Lance Nill), Issued: Feb. 25, 2023 (English Translation).
(Continued)

*Primary Examiner* — Brian E Glessner
*Assistant Examiner* — Adam G Barlow
(74) *Attorney, Agent, or Firm* — LAW OFFICES OF MICHAEL L. WISE, LLC

(57) ABSTRACT

An anchor platform assembly for anchoring an object to a raised, generally flat roof-like structure, has an anchor baseplate having a top surface and a bottom surface, and an internally threaded blindbore extending at least partially from the top surface generally towards the bottom surface and fasteners for fastening an object to the anchor baseplate via its blindbore, and for fastening the anchor baseplate to a top surface of a roof-like structure. The assembly is especially intended for supporting, e.g., glass railings on balconies, terraces and flat roofs and for mounted solar panels on both flat and pitched roofs which provides strength and affords watertight performance.

10 Claims, 10 Drawing Sheets

Related U.S. Application Data continuation of application No. 15/852,733, filed on Dec. 22, 2017, now Pat. No. 10,501,939.

(58) Field of Classification Search
CPC .... E04F 11/1853; E04F 11/1812; E02D 5/74; E02D 27/42; E04H 12/22; F24S 25/40
USPC .................. 52/169.8, 296, 709–711
See application file for complete search history.

(56) References Cited

U.S. PATENT DOCUMENTS

| | | | | |
|---|---|---|---|---|
| 2,881,016 A * | 4/1959 | Wagner | E04F 11/1812 | 403/230 |
| 3,284,973 A * | 11/1966 | Ames | E01C 23/01 | 52/155 |
| 3,323,765 A * | 6/1967 | Fernandez | E04H 12/2261 | 52/295 |
| 3,603,622 A * | 9/1971 | March | E04D 3/36 | 52/92.2 |
| 3,868,732 A * | 3/1975 | Engelhart | E04H 4/143 | 403/197 |
| 3,967,906 A * | 7/1976 | Strizki | E01F 9/635 | 403/2 |
| 4,363,467 A * | 12/1982 | Bos | E04F 11/181 | 52/704 |
| 4,581,863 A * | 4/1986 | Thaler | E04G 21/3276 | 52/126.2 |
| 4,614,070 A * | 9/1986 | Idland | E04H 12/2253 | 52/713 |
| 4,749,318 A * | 6/1988 | Bredal | F16B 37/122 | 411/180 |
| 5,375,384 A * | 12/1994 | Wolfson | E04B 1/0007 | 52/297 |
| 5,596,845 A * | 1/1997 | Strizki | E01F 9/635 | 52/707 |
| 5,603,187 A * | 2/1997 | Merrin | F24S 25/61 | 52/90.2 |
| 6,015,138 A * | 1/2000 | Kohlberger | E04H 12/2261 | 256/70 |
| 6,202,371 B1 * | 3/2001 | Natelli, Jr. | E04H 12/2292 | 52/832 |
| 6,213,701 B1 * | 4/2001 | Ukai | F16B 13/0833 | 411/340 |
| 6,336,620 B1 * | 1/2002 | Belli | E04F 11/1812 | 248/519 |
| 6,516,741 B1 * | 2/2003 | Sorum | G10K 9/04 | 285/142.1 |
| 6,568,145 B2 * | 5/2003 | Bartel | E04F 11/181 | 52/832 |
| 7,475,479 B1 * | 1/2009 | Ross | E04F 11/1812 | 29/525.01 |
| 8,424,255 B2 * | 4/2013 | Lenox | H01R 4/64 | 52/173.3 |
| 8,448,405 B2 * | 5/2013 | Schaefer | E04D 13/1407 | 52/60 |
| 8,453,416 B2 * | 6/2013 | Brindle | E04C 3/005 | 52/854 |
| 8,479,455 B2 * | 7/2013 | Schaefer | H02G 3/088 | 52/220.8 |
| 8,752,338 B2 * | 6/2014 | Schaefer | H01R 4/64 | 52/173.3 |
| 8,833,031 B2 * | 9/2014 | Steffen | F24S 25/61 | 52/173.3 |
| 8,959,857 B1 * | 2/2015 | Lin | E04H 12/2261 | 52/297 |
| 9,103,112 B2 * | 8/2015 | Corsi | H02S 20/24 | |
| 9,194,130 B1 * | 11/2015 | Stanley | E04B 1/58 | |
| 9,712,106 B2 * | 7/2017 | Wentworth | H02S 20/23 | |
| D805,223 S * | 12/2017 | DeBellis | D25/199 | |
| 9,976,298 B2 * | 5/2018 | Bergman | E04B 1/486 | |
| D908,196 S * | 1/2021 | Tropper | D23/262 | |
| 2005/0053449 A1 * | 3/2005 | Grubert | F16B 5/025 | 411/546 |
| 2005/0115158 A1 * | 6/2005 | Brown | E04D 13/0641 | 52/11 |
| 2006/0230694 A1 * | 10/2006 | Skov | E04D 13/03 | 52/200 |
| 2010/0109318 A1 * | 5/2010 | Mulligan | E04D 13/0409 | 428/596 |
| 2010/0281791 A1 * | 11/2010 | Intagliata | E04H 12/2261 | 52/849 |
| 2012/0090263 A1 * | 4/2012 | Schaefer | H02G 3/088 | 220/3.9 |
| 2012/0144760 A1 * | 6/2012 | Schaefer | F16M 13/022 | 248/237 |
| 2013/0000243 A1 * | 1/2013 | Steffen | F24S 25/61 | 52/704 |
| 2013/0008102 A1 * | 1/2013 | Bindschedler | F24S 25/33 | 52/173.3 |
| 2013/0008121 A1 | 1/2013 | Dalen | | |
| 2013/0108392 A1 * | 5/2013 | Henriksen, Jr. | F16B 33/002 | 411/166 |
| 2013/0145704 A1 * | 6/2013 | Stein, Jr. | E06B 1/02 | 52/745.15 |
| 2013/0291479 A1 * | 11/2013 | Schaefer | F24S 25/70 | 52/745.21 |
| 2013/0292531 A1 * | 11/2013 | Schaefer | F16M 13/022 | 248/237 |
| 2014/0007532 A1 * | 1/2014 | Schaefer | E04D 13/1407 | 52/302.6 |
| 2014/0008506 A1 * | 1/2014 | Schaefer | E04B 1/388 | 248/237 |
| 2014/0174554 A1 * | 6/2014 | Meyberg | F16K 1/48 | 137/315.27 |
| 2014/0208664 A1 * | 7/2014 | Schaefer | E04C 3/06 | 52/705 |
| 2014/0208680 A1 * | 7/2014 | Schaefer | F16B 9/056 | 248/237 |
| 2014/0252292 A1 * | 9/2014 | Clarke | E04H 17/1413 | 256/65.14 |
| 2015/0184406 A1 * | 7/2015 | Naylor | E04G 23/0207 | 52/741.11 |
| 2015/0218824 A1 * | 8/2015 | Schaefer | F24S 25/20 | 52/704 |
| 2016/0145873 A1 * | 5/2016 | Green | E04F 11/1814 | 52/832 |
| 2017/0175384 A1 * | 6/2017 | Bergman | E04B 1/486 | |
| 2017/0298617 A1 | 10/2017 | Espinosa | | |
| 2020/0096036 A1 * | 3/2020 | Stumpf | B29C 65/08 | |

FOREIGN PATENT DOCUMENTS

| | | |
|---|---|---|
| EP | 2662646 B1 | 11/2013 |
| ES | 2091699 | 11/1996 |
| FR | 2758352 | 7/1998 |
| JP | H09158334 A | 6/1997 |
| JP | 2005281978 A | 10/2005 |
| JP | 2006350159 A | 12/2006 |
| JP | 2012112137 A | 6/2012 |
| JP | 2020533122 A | 11/2020 |

OTHER PUBLICATIONS

Google translation of ES2091699.
Google translation of FR2758352.
A second Office Action filed in UAE Application No. P6000195/2021.

* cited by examiner

ANCHOR PLATFORM ASSEMBLY

RELATED APPLICATIONS

This application is a continuation of U.S. patent application Ser. No. 16/677,236 filed Nov. 7, 2019 which, in turn, is a continuation of U.S. patent application Ser. No. 15/852,733, filed Dec. 22, 2017, now U.S. Pat. No. 10,501,939.

BACKGROUND OF THE INVENTION

1. Field of the Invention

An anchor platform assembly for anchoring roof accessory structures to roofs and other raised, flat and pitched structures, terraces, balconies and the like, e.g., railings and solar panels, while providing both strength and watertight performance.

2. Brief Description of the Prior Art

Various methods for mounting and waterproofing roof equipment, accessory structures or the like, which are attached to sloped or flat roofs, building terraces, roof decks, etc. are well known. In the roofing industry, there are many problems with water infiltration at equipment attachment points, particularly when flashing is not incorporated and/or sealants are solely relied on. A variety of sheathing methods and combinations thereof are used as a water and moisture barrier on such structures such as asphalt roof tiles, poured or sheeted plastic or rubber membranes and the like. Currently, more and more roof heavy roof structures are being mounted on roofs such as, e.g., solar panels, satellite dishes, HVAC equipment, and especially for roof decks, balconies, terraces and the like, glass walls and/or railings are being mounted to avoid viewing obstructions such as would normally be the case with a wooden, cable or metal fence. These generally heavy structures must also be anchored to the roof structures, but because of the loads they generate and the manner in which they are mounted, typically with anchors bolted through the roof, they create a "conduit" for water to penetrate through the roof, notwithstanding the fact that the adhesive and glue are often used to seal the conduit in an attempt to prevent such water penetration. In fact, over time, these heavy structures as a result of normal repetitive roof movement or shifting caused by, e.g., settling, temperature changes, and/or high winds, cause cracks in the adhesive or glues employed and cause eventual roof leaks. As a result, it is difficult for many of the installers to provide guarantees or obtain insurance against water or moisture damage caused by such conventional anchoring systems.

The present invention seeks to overcome this problem by providing a novel anchoring system which avoids such problems in an advantageous and effective manner.

Accordingly, it is an object of the present invention to provide a novel anchor platform assembly for anchoring equipment and/or roof accessory structures to roofs and the like which can accommodate heavy loads and provide waterproof protection at the equipment attachment points.

It is a further object of the present invention to provide such a novel anchor platform assembly which is relatively simple in design and construction, easy to install and is relatively inexpensive to make.

It is a further object of the present invention to provide such a novel anchor platform assembly which can be used for a variety of roof or raised structures, including both flat roofs and pitched roofs, as well as roof decks, outdoor balconies, terraces and the like.

It is a more particular object of the invention to provide such a novel anchor platform assembly which is more reliable than prior art systems in providing a waterproof connection at the equipment attachment points.

It is yet a further object of the present invention to provide such a novel anchor platform which is universally adaptable for anchoring and mounting a multitude and wide variety of roof accessory structures including, inter alia, solar panels, satellite dishes, safety rails, glass railings, HVAC heating and air conditioning equipment, decorative sculptures, holiday ornaments, and the like, etc., while at the same time providing a watertight connection.

SUMMARY OF THE INVENTION

Certain of the foregoing and related objects are achieved according to the present invention by the provision of an anchor platform assembly for anchoring an object to a raised, roof-like structure, which includes an anchor baseplate having a top surface and a bottom surface, and a threaded blind bore extending at least partially from the top surface generally towards the bottom surface, means for fastening an object to the anchor baseplate via the blind bore and means for fastening the anchor baseplate to a roof-like structure.

In a preferred embodiment, the anchor baseplate is rectangular, the blind bore is generally centrally-disposed in the anchor baseplate and the anchor baseplate has a plurality of spaced-apart, ancillary through holes spaced from the blind bore and disposed generally adjacent to the periphery of the anchor baseplate. Most advantageously, the assembly includes a plurality of mechanical fastening members, each receivable through one of the ancillary holes for fastening the anchor baseplate to the roof-like structure and a mechanical fastener threadably receivable in the centrally disposed threaded blind bore for anchoring an object thereto. Preferably, the plurality of mechanical fastening members are screws and the mechanical fastener member receivable in the centrally-disposed threaded blind bore is a threaded bolt.

In a particularly preferred embodiment of the invention, the anchor baseplate additionally includes an elongated post depending from the bottom surface thereof in which the blind bore is at least partially defined, with the post having a top end secured to the bottom surface of the anchor baseplate and a closed bottom end. Desirably, the anchor baseplate post is cylindrical and may optimally be at least partially externally threaded. In the latter case, a nut is receivable on the externally threaded post for securing the anchor platform assembly to the raised roof-like structure from below. Most desirably, the anchor baseplate is made from stainless steel.

In another preferred embodiment of the present invention, the anchor baseplate has a centrally-disposed, non-threaded bore and the post has a reduced diameter neck portion adjacent its top end which is configured and dimensioned for receipt within the centrally-disposed, non-threaded bore.

Preferably, the anchor platform assembly also includes an object support member having a base wall and a bore formed therethrough which is positionable on said anchor baseplate so that the base wall bore is aligned with said threaded blind bore. Advantageously, the assembly further includes an elongated and U-shaped support for an object which has a generally planar base wall, a support stand having a planar base and an upstanding tubular body member joined to the planar base, with the planar base having a throughbore formed therethrough alignable with the blind bore of the anchor baseplate and the tubular body member having opposing sidewalls, each having a throughbore aligned with the throughbore in the opposing sidewall. The assembly also includes an object support member having at least one base wall with a throughbore extending therethrough, means for mechanically fastening the object support member to the support stand via the sidewall throughbores of the support stand and the wall of the object support stand; and means for mechanically fastening the support stand to the anchor baseplate via the throughbore of the base wall thereof and the threaded blind bore of the anchor baseplate.

In another particularly preferred embodiment of the present invention, the anchor baseplate is generally solid and has a generally frusto-pyramidal shape and comprises a generally planar top wall defining the top surface of the anchor baseplate and a generally planar bottom wall defining the bottom surface. Most desirably, the anchor baseplate is generally square-shaped and has four sloping sidewalls extending between the top and bottom walls, and the sidewalls each having a recessed cutout and a throughbore extending from each of the recessed cutouts to the bottom surface of the bottom wall. Additionally means are provided for mechanically fastening the anchor baseplate to a roof-like structure via the throughbores of the sidewalls.

BRIEF DESCRIPTION OF THE DRAWINGS

Other objects and features of the present invention will become apparent from the detailed description considered in connection with the accompanying drawings, which disclose several embodiments of the invention. It is to be understood that the drawings are to be used for the purpose of illustration only and not as a definition of the limits of the invention.

FIG. 8b is a plan view of the anchor platform assembly shown in FIG. 8a;

FIG. 8c is a side view of the anchor platform assembly shown in FIG. 8a;

FIG. 8d is an exploded, cross-sectional view of the fourth embodiment of the anchor platform assembly comparable to FIGS. 4b, 5a, and 6a.

DETAILED DESCRIPTION OF THE PREFERRED EMBODIMENTS

Figure 1:
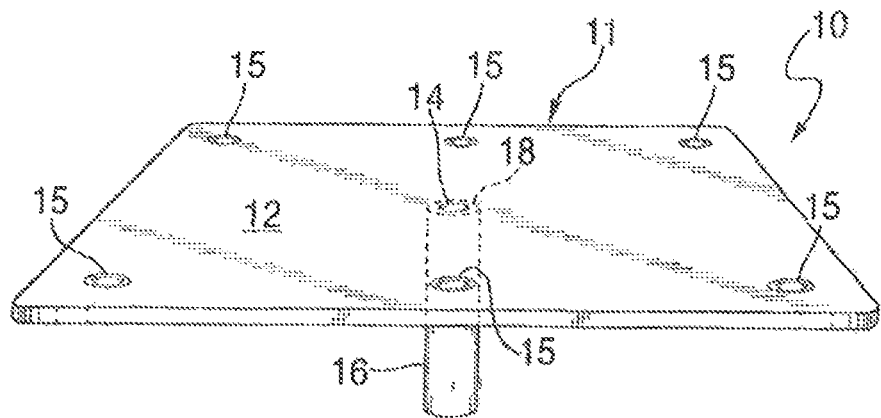
FIG. 1 is a top and side perspective view of a first embodiment of an anchor baseplate utilized in an anchor platform assembly embodying the present invention.
Figure 2:
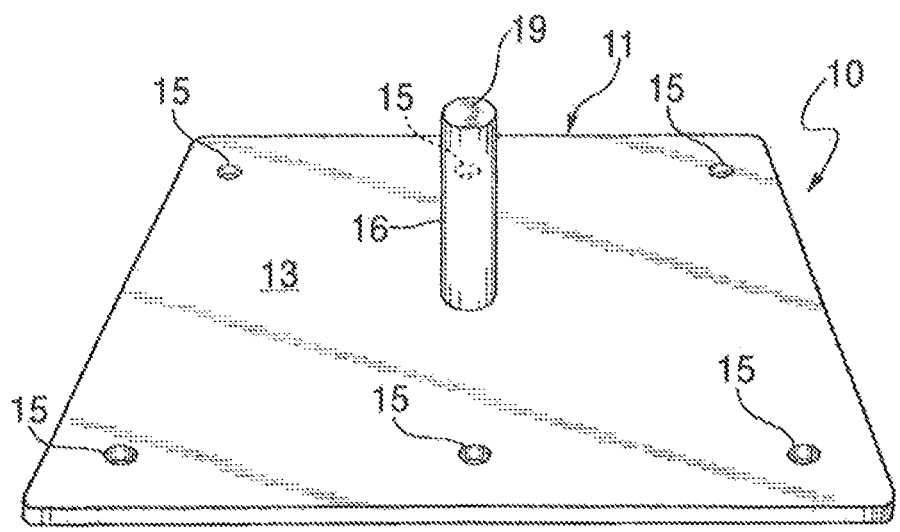
FIG. 2 is a bottom and side perspective view of the anchor baseplate shown in FIG. 1.

Turning now in detail to the drawings and, in particular, to FIGS. 1-4c thereof, therein illustrated is a first embodiment of a novel anchor platform assembly embodying the present invention, generally designed by reference numeral 10, for anchoring roof accessory structures to roofs and other raised, flat and/or pitched structures, such as terraces, balconies, stairs and the like. The main component of the anchor platform assembly is the anchor baseplate, generally designated by reference numeral 11, which preferably is made of stainless steel (but could be made of other metals, such as aluminum, bronze, etc.), and is square or rectangular shaped and has a top surface 12 and a bottom surface 13. The anchor baseplate 11 has an internally-threaded central through bore 14 and six spaced apart peripheral through bores 15 positioned radially outward from the center bore 14 and generally adjacent to the periphery of the baseplate 11. In this embodiment, the anchor baseplate 11 also includes a preferably cylindrical rod or post 16 having an axially-extending, internally-threaded bore 17 (see FIG. 4b) having a top open end 18 and a closed bottom 19 (FIG. 2) which is secured preferably via welding to the anchor baseplate 11 so that the top open end 18 of its bore 17 abuts and is in registry with the bottom open end of center through bore 14 (see FIG. 4*b*).

Figure 3:
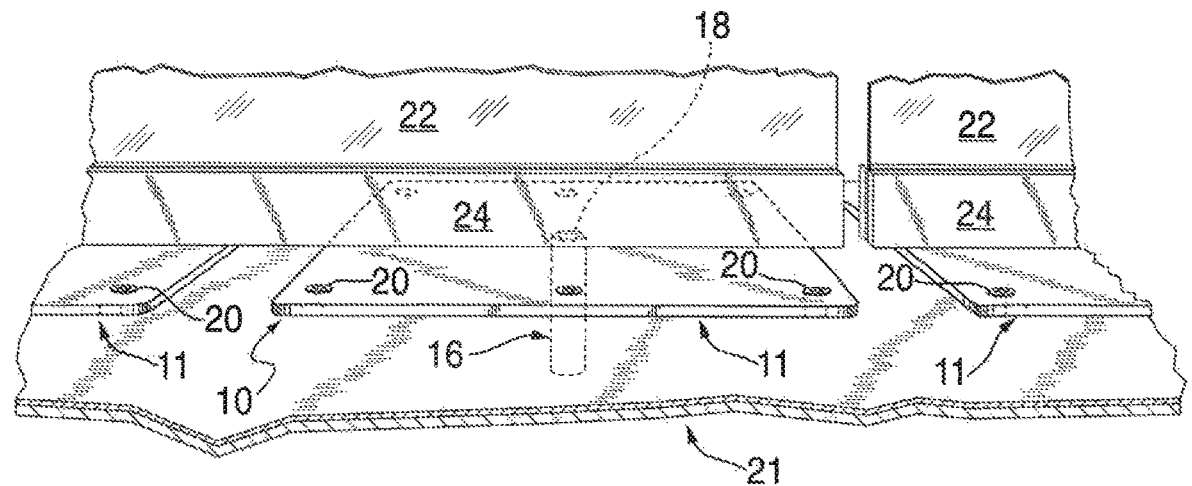
FIG. 3 is fragmentarily-illustrated a perspective view of a first embodiment of the anchor platform assembly embodying the present invention employing a plurality of serially-arranged anchor baseplates mounted on a roof deck and anchoring thereto a plurality of spaced apart elongated rails having U-shaped channel or shoe in which, in turn, is mounted on a pair of glass railings.

As shown in FIG. 3, the anchor baseplate 11 of the anchor platform assembly 10 is typically mounted via mechanical fastening elements 20 preferably in the form of nails or bolts, to a roof structure, such as a roof deck, generally designated 21, with its cylindrical post 16 extending through the roof deck 21 and projecting below the roof deck with its closed end 19. The internally threaded and aligned bores 14 and 17 serves as an anchor point for an object to be mounted on the roof deck 21. In this case, the object is a glass railing of the type that has glass panel 22 with a lower edge secured within an elongated U-shaped metal channel or shoe 24. FIG. 3 specifically depicts three serially arranged and spaced apart anchor baseplates 11 to which two glass panels 22 and two shoes 24 are at least partially mounted. In use, such glass railings can be hundreds of feet in length. As can be appreciated, depending on the length of each glass railing 22, two or more anchor baseplates 11 per glass rail 22 may be required as shown in FIG. 3.

Figure 4A:
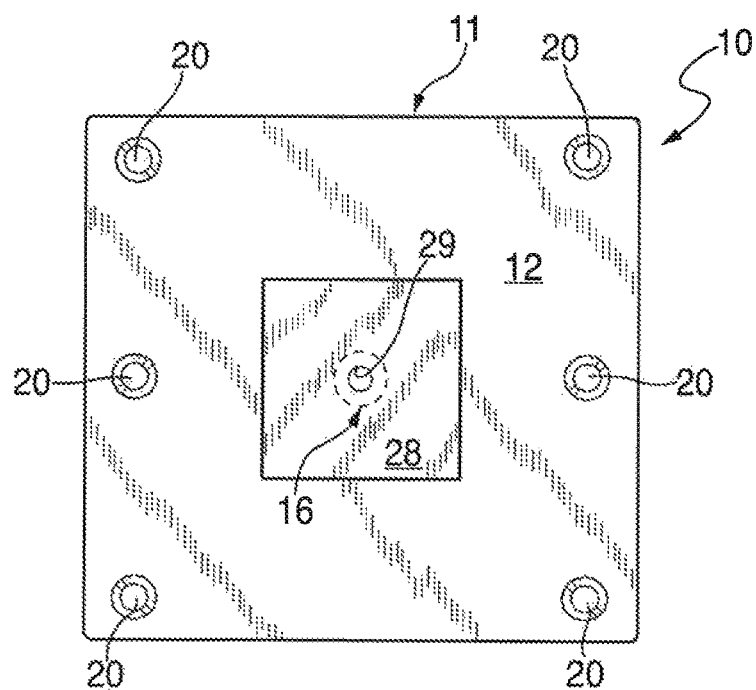
FIG. 4a is a plan view of the anchor baseplate and an optional shim plate centered thereon for adjusting the height of the rail.
Figure 4B:
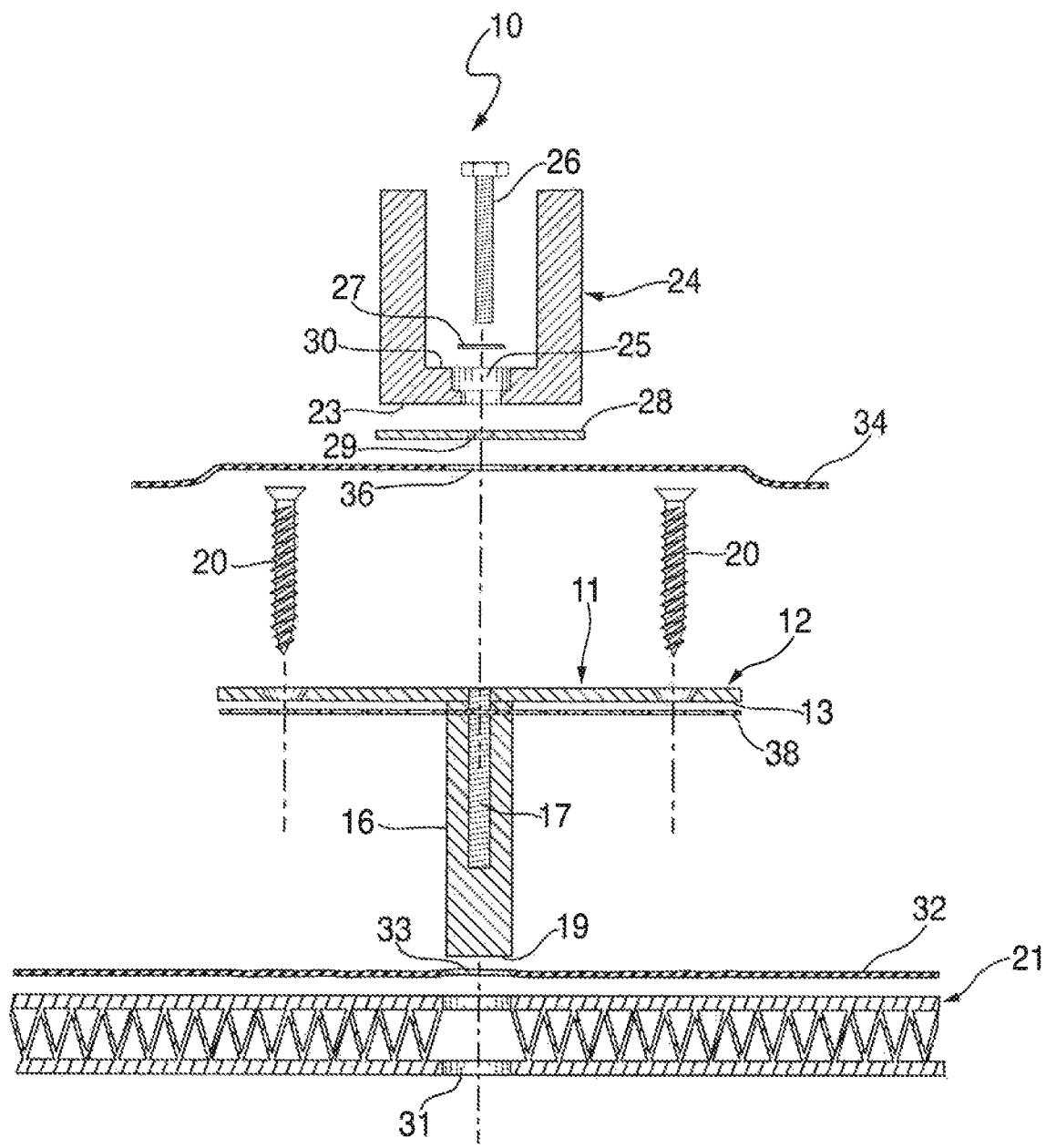
FIG. 4b is an exploded, cross-sectional view of the anchor platform assembly including the anchor baseplate and shim plate shown in FIG. 4a in positional relationship with respect to the U-shaped shoe and the roof deck shown in FIG. 3 and further showing the roof flashing associated therewith including an anchor baseplate membrane and a roof membrane, and the fastening means employed therewith.

As seen best in FIG. 4*b*, the elongated U-shaped shoe 24 has a base wall 23 with a plurality of spaced apart through bores 25 (one of which is shown). As will be discussed in greater detail hereinafter, mechanical fasteners are used, such as a threaded bolt 26 and washer 27, which bolt 26 is receivable through the through bores 25 of the U-shaped shoe 24 and are receivable within the internally-threaded center bore 14 of anchor baseplate 11 and internally-threaded blind bore 17 of the cylindrical post or rod 16 (FIG. 4*b*) to anchor the same to the roof deck 21. The cylindrical post 16 with the closed bottom 19 serves two purposes: (1) it provides a relatively sturdy and rigid anchoring support point for the object to be mounted on the roof, and (2) it prevents water from penetrating via the central bore 14 into and below the roof deck 21 as a result of blind bore 17 and the bottom end 19 of the cylindrical rod 16 being closed.

FIG. 4*a* shows the use of a square-shaped shim plate 28 having a central through bore 29 mounted atop the anchor baseplate 11 such that its central through bore 29 is directly over and in registry with the internal blind bore 17 of the cylindrical post 16. The shim plate 28 is used to adjust the height of the shoe 24 to ensure proper alignment of adjacent shoes 24 and the glass railing(s) 22 they support due to variations in height of the roof deck 21 or the like. Additional shim plates 28 can, of course, be used, if needed, to achieve proper height alignment.

Figure 4C:
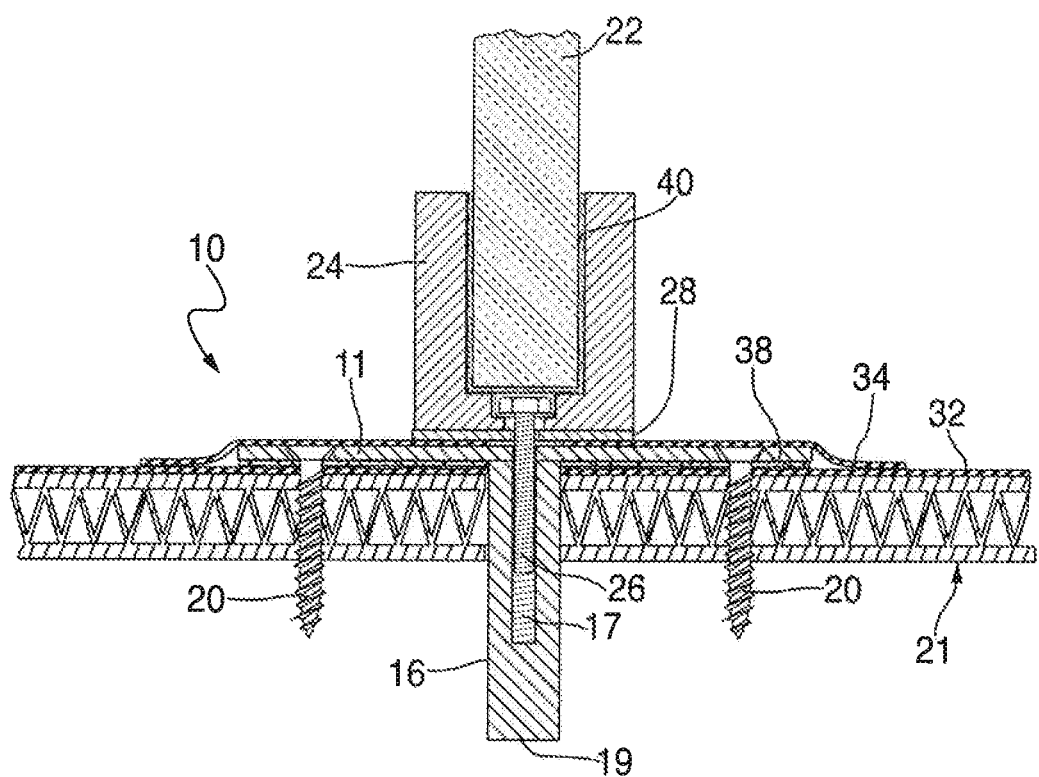
FIG. 4c is a cross-sectional view of the anchor platform assembly shown in FIG. 4b in a fully, mounted state on a roof deck whereby the glass rail is anchored via its U-shaped shoe to the roof, and also showing the use of flashing materials, fasteners and adhesives employed therewith.

As illustrated in FIGS. 4*b* and 4*c*, the central throughbore 25 of the U-shaped channel or shoe 24 contains a step which is dimensioned and configured to receive and support the bolt head of bolt 26 and washer 27 on the step so that the bolt head of bolt 26 is disposed below the top surface 30 of the lower base wall 23 of U-shaped shoe 24 so as not to abut and possibly crack or damage the bottom edge of the glass railing 22.

FIGS. 4*b* and 4*c* respectively show an exploded cross-sectional view and a fully mounted cross-sectional of the anchor platform assembly 10 which include preferred flashing materials, fasteners and adhesives and the like for mounting a glass railing to a roof deck or terrace or the like. As shown in FIG. 4*b*, the anchor baseplate 11 is positioned above the roof deck 21 which may be of wood, metal or composite construction as is standard or conventional in the industry. The cylindrical post 16 of the anchor baseplate 11 is intended to be inserted through a through bore 31 in the roof deck 21 and a conventional rubber roof membrane 32, preferably made of neoprene, which also has a through bore 33 is preferably interposed between the anchor baseplate 11 and roof deck 21. Similarly, a conventional rubber roof membrane 34, also preferably made of neoprene, is preferably positioned between the optional shim plate 28 and the top surface 12 of the anchor baseplate 11 and it too is provided with a central bore 36 to allow the bolt 26 to pass through the membrane 34. In addition, a sealant, cement, caulk or adhesive layer 38 is shown which would normally be applied to the bottom surface 13 of the anchor baseplate 11 to adhesively join and seal the same to the roof membrane 32.

As also shown in FIG. 4*c*, an adhesive, caulk or glue 40 is also applied to the inner surface of the U-shaped channel 24 so that it surrounds the lower end of glass railing 22 received within the U-shaped metal channel 24. As also illustrated therein, the anchor baseplate membrane 34 extends over the entire anchor baseplate 11 with its ends sealed against the roof membrane 32 thereby sealing the screw holes and the remainder of the anchor baseplate 11. As can be appreciated, these flashing materials and adhesives serve to waterproof the assembly and protect the roof from leaks.

As previously mentioned, this is particularly important at the point of attachment of the object to the roof which, in this case, refers to the point of attachment of the glass railing shoe 24 to the anchor baseplate cylindrical post 16 via bolt 26 and the blind threaded bore 17 in which the bolt 26 is received. Since bore 17 is a blind bore or hole and bottom end 19 of the cylindrical post 16 is closed, the potential path of any water that could conceivably penetrate between the glass panel 22 and the U-shaped channel 24 and enter the bore 17 of the cylindrical post 16 is totally blocked from penetrating the roof deck 21.

Figure 5A:
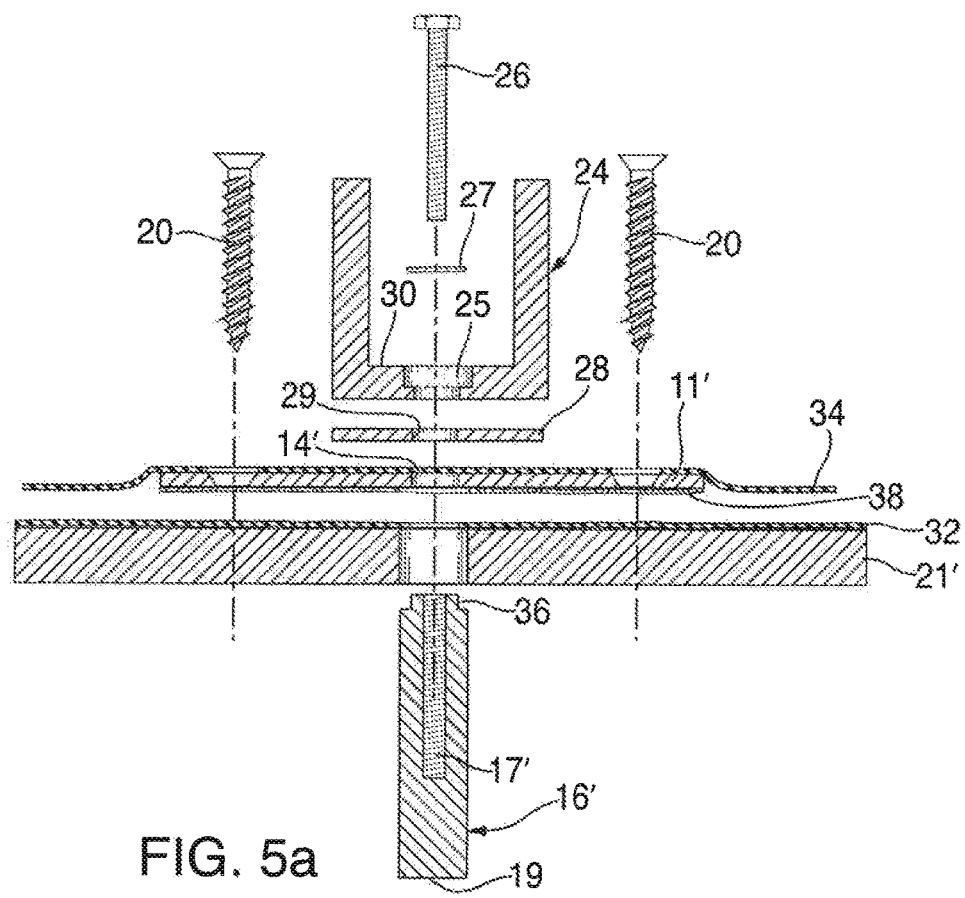
FIG. 5a is an exploded, cross-sectional view of a second embodiment of the anchor platform assembly comparable to FIG. 4b, but showing the anchor baseplate having an internally threaded post with a reduced width neck section.
Figure 5B:
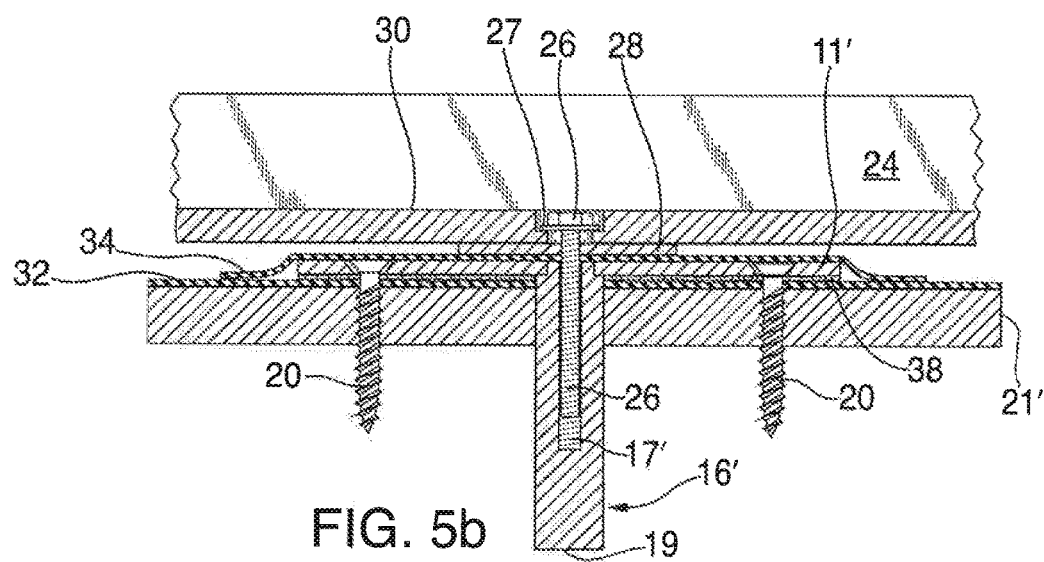
FIG. 5b is a cross-sectional view of the second embodiment of the invention in a fully mounted state, comparable to FIG. 4c, but showing the use of an internally threaded post with a reduced width neck section seated within the central bore of the anchor baseplate.

FIGS. 5*a* and 5*b* illustrate a second embodiment of the anchor baseplate assembly and, in a similar fashion, respectively show an exploded cross-sectional view and a fully mounted cross-sectional view of this second anchor platform assembly embodiment. The elements shown in this second embodiment are the same as shown in FIGS. 4*b* and 4*c* with the exception that the cylindrical post 16' is provided with a narrow neck portion 36 and the baseplate 11' is provided with a non-threaded central bore 14', but both are otherwise identical to the baseplate 11 and cylindrical post 16 shown in the previous embodiment. In FIGS. 4*b* and 4*c* the top end 18 of the cylindrical post 16 would typically be welded to the bottom surface 13 of the anchor baseplate 11. In FIGS. 5*a* and 5*b* however, the narrow neck section 36 is intended to be received within the non-threaded central bore 14' of the anchor baseplate 11' and as a result of this construction, a more robust, and stronger bond can be made due to the fact that when said anchor plate 11' and post 16' are welded together with the respective center bore 14' and internal threaded bore 17' being held in proper alignment by the reduced neck section 36 of the post 16' being received in the center bore 14'.

Figure 6A:
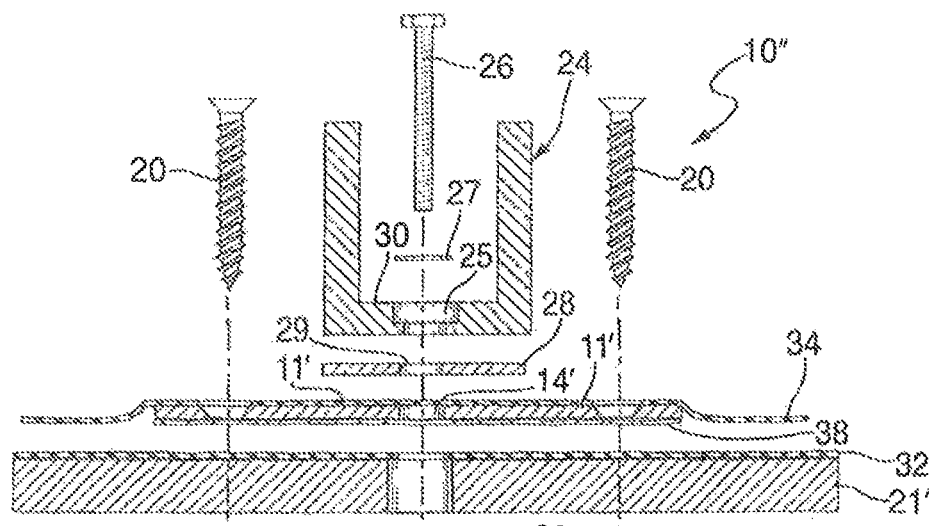
FIG. 6a is an exploded, cross-sectional view of a third embodiment of the anchor platform assembly comparable to that shown in FIGS. 4b and 5a, but showing an anchor baseplate having an externally threaded post.
Figure 6B:
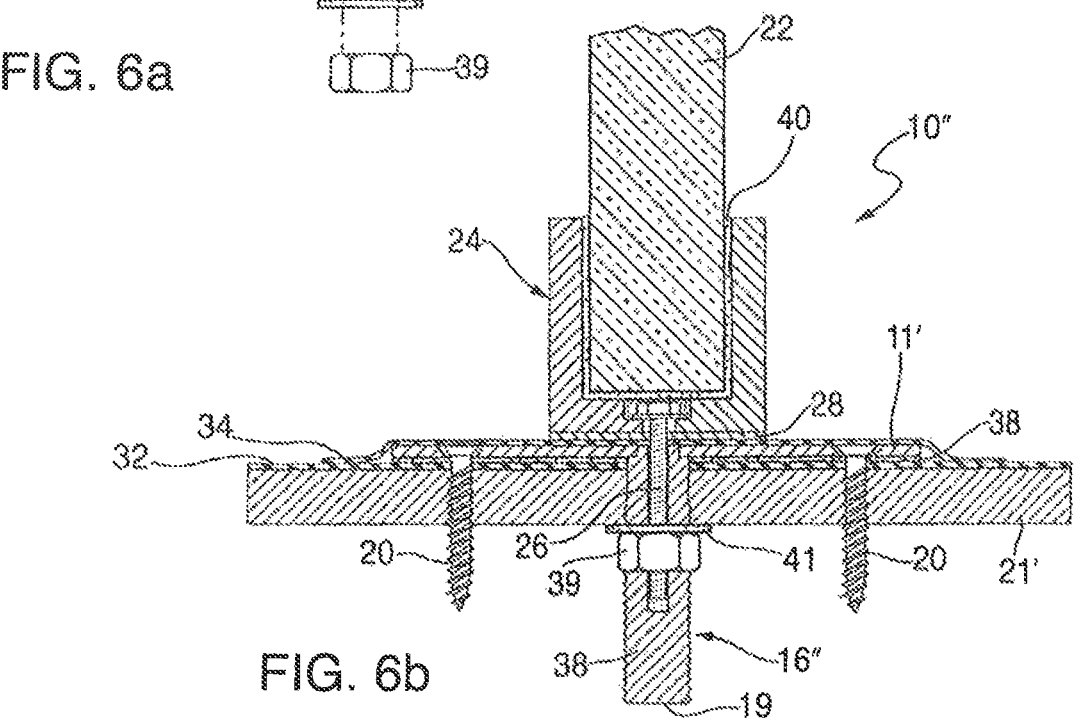
FIG. 6b is a cross-sectional view of the third embodiment of the anchor platform assembly in a fully mounted state comparable to that of FIGS. 4 and 5b, but showing the externally threaded post securing the anchor baseplate to the roof deck from beneath the roof deck via a nut and a washer.

FIGS. 6*a* and 6*b* illustrate a third embodiment of the anchor baseplate assembly 10" and, in a similar fashion, respectively show an exploded cross-sectional view and a fully mounted cross-sectional view of this third anchor platform assembly embodiment.

The elements shown in this third embodiment are the same as shown in FIGS. 5*a* and 5*b* with the exception that the lower portion 38 of cylindrical post 16" is externally threaded but is otherwise identical to the cylindrical post 16'. In this embodiment, a nut 39 and washer 41 are threaded onto the externally threaded surface 38 of the cylindrical post 16" so that in the fully assembled state shown in FIG.

6b, the nut 39 and washer 41 are tightened against the lower surface of the metal roof deck 21' to provide a stronger point of attachment while at the same time preventing roof leaks at the point of attachment via the blind bore 17' and the closed end 19 of the cylindrical post 16".

Figure 7A:
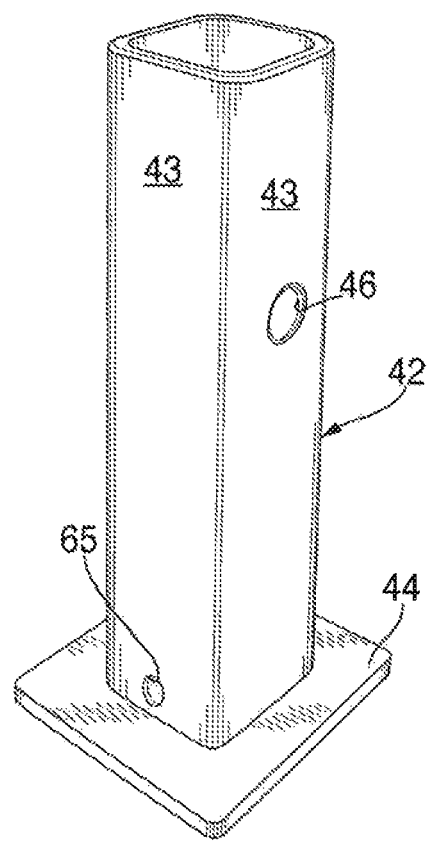
FIG. 7a is a perspective view of an anchor platform assembly accessory unit embodying the present invention for supporting a roof accessory structure in an offset and raised arrangement relative to the anchor base platform and roof deck respectively.
Figure 7B:
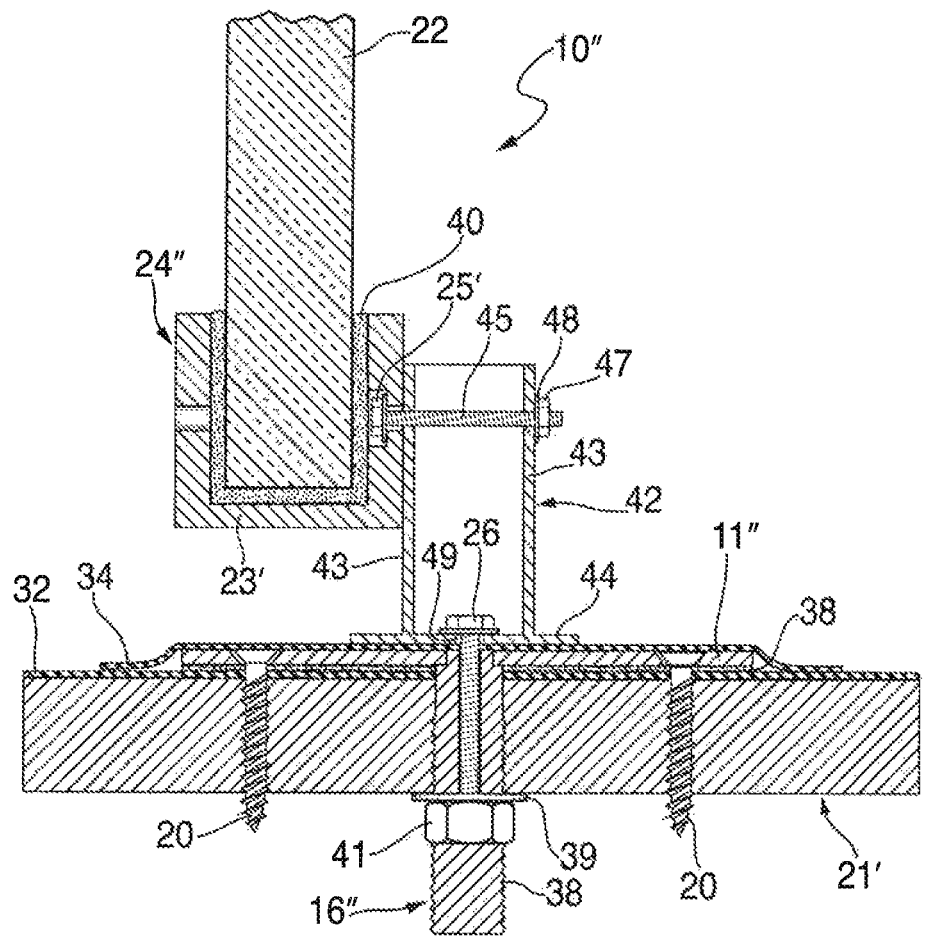
FIG. 7b is a cross sectional view similar to FIG. 6b, but showing the accessory unit supporting the glass railing and its supporting shoe in a raised position spaced above the roof deck and offset from the center hole in the anchor baseplate.

FIGS. 7a and 7b illustrate a novel accessory support stand 42 for the various anchor plate assemblies shown herein which allows the user to support an object in a raised and spaced manner above the anchor baseplate. The accessory support stand 42 comprising a preferably metal, square or rectangular planar base 44 and an upstanding preferably metal square-shaped, tubular body member joined at one end to the planar base 44 by welding. A weep hole 65 is provided at the base of one sidewall 43 to allow water to drain therefrom. The baseplate 44 has a central hole 49 (FIG. 7b) which is alignable with the internally threaded bore 17' of the cylindrical post 16" and the threaded stem of bolt 26 is threadably received within the internally-threaded bore 17' to anchor the support stand 42 to the anchor baseplate 11". At least one set of horizontally aligned holes 46 are formed in opposite side walls 43 of the upstanding tubular body through which a threaded bolt 45 could be mounted to secure an object to one of the sidewalls 43 of the support stand 42 as shown best in FIG. 7b. In this case, the U-shaped channel 24" is provided with a recessed through bore 25' in one of its sidewalls rather than in its base wall 23' as shown in the embodiments of FIGS. 1-6. The bolt 45 is held in the recessed throughbore 25' via its bolt head being held against the step of the channel through bore 25' and at its opposite end by an additional nut 47 and washer 48 to secure the U-shaped channel 24" in a raised and elevated position relative to the anchor baseplate 11" and roof member 21' and offset relative to the center blind bore of the anchor baseplate 11".

Finally, FIGS. 8a-8e disclose a fourth embodiment of the anchor platform assembly 10''' wherein the anchor baseplate 11''' has a lower square-shaped, planar base portion 50 and a frusto-pyramidal upper portion which defines four upwardly tapered sidewalls 51 and a square-shaped planar top wall 52. The top wall 52 has a internally threaded, centrally-disposed blind bore 54 and each of the sidewalls 51 have a recessed, generally cylindrical cutout or cavity 55 which opens onto a throughbore 56 which extends through the bottom portion 50 and in turn, opens on the bottom surface 57 thereof.

Figure 8A:
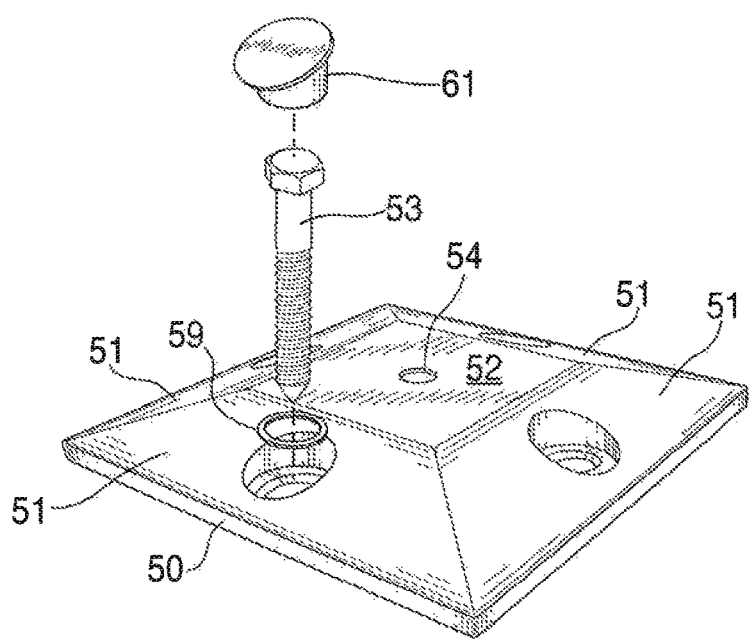
FIG. 8a is a top and side perspective view of a fourth embodiment of the anchor platform assembly embodying the present invention, showing in an exploded view, the employment of a cap lag, bolt and washer associated with one of the recessed throughbore cavities.
Figure 8B:
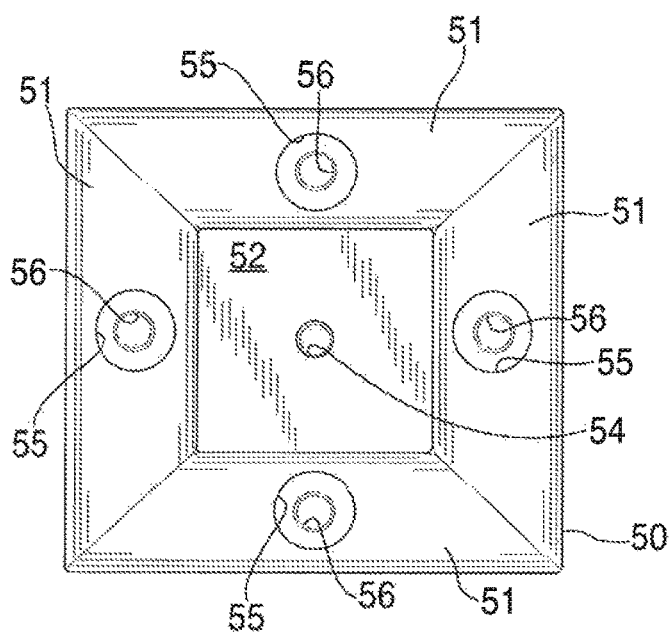
Figure 8C:
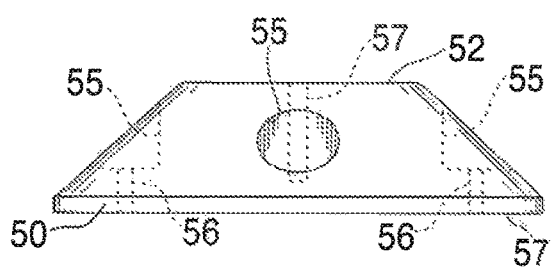
Figure 8D:
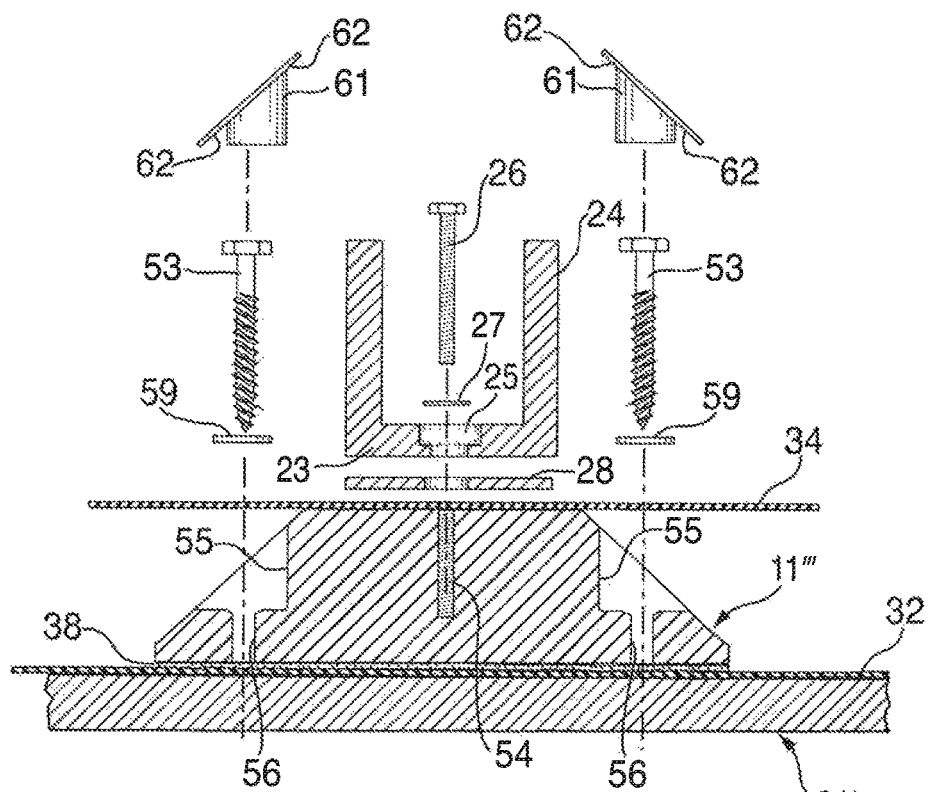
Figure 8E:
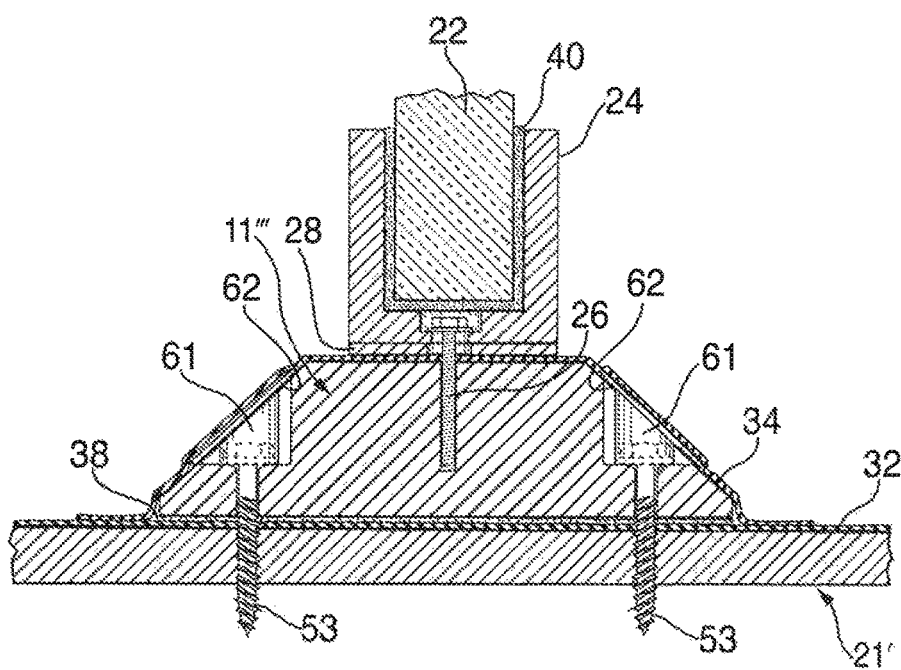
FIG. 8e is a cross-sectional view of the fourth embodiment of the anchor platform assembly in a fully mounted state comparable to that shown in FIGS. 4c, 5b, and 6b, showing anchoring a glass railing to a metal rod and further showing the use of roof flashing materials, fasteners, and adhesives employed therewith.

As seen in FIGS. 8d and 8e which respectively show an exploded cross-sectional view and a fully mounted cross-sectional view of this fourth embodiment of the anchor platform assembly, the top wall 52 is used to anchor an object 24 to the roof structure via its internally threaded central blind bore 54. Lag screws 53 are inserted in each of the sidewall throughbores 55 to affix the anchor baseplate 11''' to the metal roof deck 21'. The sidewall cavities 55 are then covered by generally cup-shaped caps 61 having radially-extending flanges 62 which are intended to close off and seal the cavities 55 and to prevent water infiltration. Like the other embodiments, a roof membrane 32 is deployed between the anchor baseplate 11''' and the metal roof structure 21' and an anchor baseplate membrane 34 is also disposed directly over the anchor baseplate 11''' and its ends extends over the roof deck membrane 32. A bolt 26 and washer 27 is provided which anchors the U-shaped support shoe 24 to the anchor baseplate 11'''. The bolt head of bolt 26 and washer 27 are received on the throughbore step 25 of the basewall 23 and the bolt is threadably received in the threaded blind bore 54 to anchor the anchor baseplate 11''', in turn, to the metal roof deck 21'. An adhesive layer 38 also binds the anchor baseplate 11''' to the roof membrane 32 to improve the waterproofing capability of the assembly.

Obviously, the materials employed, dimensions and sizing of the various parts of the anchor platform assembly can be modified to suit the particular roof application. For example, in the case of mounting a balcony railing, it would be suitable in certain applications to use 6"×6" baseplates, 4⅛" high×2½" wide aluminum shoes with ½" thick glass panels set into the aluminum shoe with anchoring cement.

As can also be appreciated from the foregoing, the shape and the number of anchor baseplates, non-threaded throughbores, threaded blind bores and placement thereof can also be modified depending upon the specific details of the application such as the nature, size and material of the roof structures, such as metal, wood or some other composite. Similarly, it is anticipated that the types of fasteners, membranes flashing materials and sealants will also be chosen to be compatible with the roof structure. Also, the elements of the various embodiments may be substituted for one another where appropriate.

While particular embodiments of the invention have been described, it is not intended that the invention be limited thereto, as it is intended that the invention be as broad in scope as the prior art will allow and that the specification be read likewise. It will therefore be appreciated by those skilled in the art that other modifications could be made thereto without departing from the spirit and scope of the invention.

What is claimed is:

1. An anchor platform assembly for anchoring an object having a planar wall with an opening therethrough to a support structure with the aid of a mechanical fastener, comprising:

a one-piece anchor comprising an anchor baseplate having a planar top surface and a planar bottom surface, and an elongated, cylindrical, at least partially threaded blind bore extending from said top surface generally towards, but short of, said bottom surface, said blind bore having an open top end and a closed bottom end, said open top end opening onto said top surface of said anchor baseplate and said closed bottom end thereof being spaced above said bottom surface of said anchor baseplate;

means for fastening said object to said anchor baseplate via said blind bore, said means for fastening comprising said elongated, cylindrical, at least partially threaded blind bore of said one-piece anchor to thereby permit said planar wall of said object to lie closely adjacent to and be anchored to said planar top surface of said anchor baseplate via said mechanical fastener and to be positionable relative to one another with said opening of said planar wall of said object axially aligned with said open top end of said blind bore of said one-piece anchor; and means for fastening said anchor baseplate to said support structure to thereby permit said planar bottom surface of said anchor baseplate to lie closely adjacent to and be anchored adjacent to said support structure;

wherein said anchor baseplate is square, said blind bore is generally centrally-disposed in said anchor baseplate and wherein said anchor baseplate has a plurality of spaced-apart, ancillary through holes spaced from said blind bore and disposed generally adjacent to a periphery of said anchor baseplate;

wherein said anchor baseplate has four sloping sidewalls extending between said top surface and said bottom surface thereof and wherein said sidewalls each have a recessed cutout and a respective one of the plurality of spaced-apart, ancillary through holes extending from each of said recessed cutouts to said bottom surface of said anchor baseplate.

2. The anchor platform assembly according to claim 1 including a plurality of mechanical fastening members, each receivable through one of said ancillary through holes for fastening said anchor baseplate to said support structure and said mechanical fastener threadably receivable in said centrally-disposed, threaded blind bore for anchoring said object thereto.

3. The anchor platform assembly according to claim 2, wherein said plurality of mechanical fastening members comprise screws and said mechanical fastener is a threaded bolt.

4. The anchor platform assembly according to claim 1, wherein said anchor baseplate is made from stainless steel.

5. An anchor platform assembly for anchoring an object to a support structure, comprising:
   a one-piece anchor comprising an anchor baseplate having a top surface and a bottom surface, and an elongated, at least partially threaded blind bore extending from said top surface generally towards said bottom surface, said blind bore having an open top end and a closed bottom end, said open top end opening onto said top surface of said anchor baseplate and said closed bottom end thereof being spaced above said bottom surface of said anchor baseplate, and wherein said anchor baseplate is generally solid and has a generally frusto-pyramidal shape and comprises a generally planar top wall defining said top surface of said anchor baseplate and a generally planar bottom wall defining said bottom surface;
   means for fastening an object to said anchor baseplate via said blind bore; and
   means for fastening said anchor baseplate to said support structure to thereby permit said bottom surface of said anchor baseplate to be anchored adjacent to said support structure;
   wherein said anchor baseplate is generally square-shaped and has four sloping sidewalls extending between said top wall and said bottom wall, and wherein said sidewalls each have a recessed cutout and a throughbore extending from said recessed cutout to said bottom surface of said bottom wall.

6. The anchor platform assembly according to claim 5, additionally including means for mechanically fastening said anchor baseplate to said support structure via said throughbores of said sidewalls.

7. The anchor platform assembly according to claim 6, additionally including a support member for said object having a base wall and at least one base wall bore formed therethrough which is positionable on said anchor baseplate so that said base wall bore is aligned with said blind bore.

8. The anchor platform assembly according to claim 7, wherein said support member for said object is elongated and U-shaped and has a generally planar base wall.

9. The anchor platform assembly according to claim 5, additionally including a support stand comprising a planar base and an upstanding tubular body member joined to said planar base, said planar base having a throughbore formed therethrough alignable with said blind bore of said anchor baseplate and said tubular body member having opposing sidewalls, each having a throughbore aligned with a throughbore in the opposing sidewall;
   an object support member having at least one sidewall with a throughbore extending therethrough;
   means for mechanically fastening said object support member to said support stand via said sidewall throughbores of said support stand and said throughbore of said object support member; and
   means for mechanically fastening said support stand to said anchor baseplate via said throughbore of said planar base thereof and said threaded blind bore of said anchor baseplate.

10. The anchor platform assembly according to claim 1, wherein said anchor baseplate has a solid core except for portions thereof defining said blind bore and said ancillary through holes.

* * * * *